(12) United States Patent
Ahn et al.

(10) Patent No.: US 6,860,434 B2
(45) Date of Patent: Mar. 1, 2005

(54) APPARATUS FOR MANUFACTURING ULTRA-FINE PARTICLES USING ELECTROSPRAY DEVICE AND METHOD THEREOF

(76) Inventors: Kang Ho Ahn, 102-1504M Ichon Apartment, 412, Ichon-dong, Yongsan-ku, Seoul (KR), 140-030; Jeong Ho Ahn, 110-502, Daelim Apartment, 501, Daebang-dong, Dongjak-ku, Seoul (KR), 156-761; Sang Hyun Ahn, 110-502, Daelim Apartment, 501, Daebang-dong, Dongjak-ku, Seoul (KR), 156-761

( * ) Notice: Subject to any disclaimer, the term of this patent is extended or adjusted under 35 U.S.C. 154(b) by 175 days.

(21) Appl. No.: 10/018,244
(22) PCT Filed: Apr. 18, 2001
(86) PCT No.: PCT/KR01/00649
§ 371 (c)(1), (2), (4) Date: Dec. 18, 2001
(87) PCT Pub. No.: WO01/83101
PCT Pub. Date: Nov. 8, 2001

(65) Prior Publication Data
US 2002/0158140 A1 Oct. 31, 2002

(30) Foreign Application Priority Data
Apr. 18, 2000 (KR) .......................................... 2000-20360

(51) Int. Cl.⁷ ............................................... B05B 1/08
(52) U.S. Cl. .................... 239/102.1; 239/135; 239/690; 239/690.1; 239/692; 239/693; 239/704; 239/708
(58) Field of Search ............................... 239/690, 690.1, 239/691, 135, 692, 693, 704, 708, 102.1

(56) References Cited

U.S. PATENT DOCUMENTS

| | | | | |
|---|---|---|---|---|
| 3,503,704 A | * | 3/1970 | Marks | 423/212 |
| 4,095,962 A | * | 6/1978 | Richards | 95/65 |
| 4,531,056 A | * | 7/1985 | Labowsky et al. | 250/288 |
| 5,015,845 A | * | 5/1991 | Allen et al. | 250/288 |
| 5,115,971 A | | 5/1992 | Greenspan et al. | |
| 5,170,053 A | | 12/1992 | Hail et al. | |
| 5,247,842 A | * | 9/1993 | Kaufman et al. | 73/865.5 |
| 5,344,676 A | * | 9/1994 | Kim et al. | 427/468 |
| 5,873,523 A | | 2/1999 | Gomez et al. | |
| 5,992,244 A | * | 11/1999 | Pui et al. | 73/865.5 |
| 6,145,391 A | * | 11/2000 | Pui et al. | 73/865.5 |

* cited by examiner

*Primary Examiner*—Robin O. Evans
(74) *Attorney, Agent, or Firm*—Lowe Hauptman Berner, LLP

(57) ABSTRACT

An apparatus and method for manufacturing ultra-fine particles using an electrospray device is disclosed. One or more capillary provided at its tip with a nozzle is positioned within a guide duct and precursors such as metal organic materials and metal halogen compounds, or nonvolatile substances or volatile substances are supplied to the capillary. Voltages are applied to the capillary and the guide duct, respectively, so that a voltage difference is generated therebetween and the highly charged liquid droplets from the capillary are sprayed. The sprayed liquid droplets are carried along the guide duct together with carrier gas injected into the guide duct. When heat energy is applied to the liquid droplets, chemical reactions of the liquid droplets occur. A collecting plate positioned in front of the guide duct collects ultra-fine particles formed by the chemical reactions.

11 Claims, 6 Drawing Sheets

APPARATUS FOR MANUFACTURING ULTRA-FINE PARTICLES USING ELECTROSPRAY DEVICE AND METHOD THEREOF

TECHNICAL FIELD

The present invention relates to an apparatus and method for manufacturing ultra-fine particles, and more particularly, to an apparatus and method for manufacturing ultra-fine particles using an electrospray device.

BACKGROUND ART

Generally, ultra-fine particles are manufactured by a method of collecting them through a filter or sticking them to a collecting plate after they have been formed by using flames or a furnace. According to this method, metal oxides such as $SiO_2$ or $Fe_2O_3$ having ultrahigh purity are obtained.

However, in conventional methods for manufacturing the ultra-fine particles, there are some disadvantages in that their collecting efficiency is very low, and in that sizes of the collected ultra-fine particles cannot be controlled. In addition, there are problems in that most of the ultra-fine particles that are not collected cannot be recovered, and in that since the ultra-fine particles that have not been recovered are mainly metal oxides, they may contaminate the environment. Especially, in the conventional methods for manufacturing the ultra-fine particles by using the filter, there is a trouble in that the filter should be frequently replaced due to serious contamination of the filter.

The study of the electro-hydrodynamic atomization (EHDA) or electrospraying has been carried out for a long time. In addition, the formation of electrically charged fine liquid droplets has been actively studied in recent years since a variety of industrial fields are very interested in the use of such liquid droplets. Electro-hydrodynamic atomizer have been preferably used for producing highly charged fine liquid droplets. Such atomizer form desired highly charged fine liquid droplets by exposing the droplets to an electric field having a high voltage difference. An example of such an electro-hydrodynamic atomizer is disclosed in U.S. Pat. No. 5,873,523. In addition, another example of the electro-hydrodynamic atomizer is described in detail in the specification and drawings of Korean Patent Application No. 2000-4208 (not laid-open), which is also owned by the applicant of the present application.

Liquid droplets generated from the electro-hydrodynamic atomizer are extremely small in the order of several ten nanometers and are highly charged. Such highly charged liquid droplets are used as an ion source or the like of a mass spectrometer.

DISCLOSURE OF INVENTION

An object of the present invention is to provide an apparatus and method for manufacturing ultra-fine particles using an electrospray device, in which very high collecting efficiency can be obtained.

Another object of the present invention is to provide an apparatus and method for manufacturing ultra-fine particles using an electrospray device, in which sizes of the ultra-fine particles can be controlled.

In order to achieve the above objects, according to an aspect of the present invention, there is provided an apparatus for manufacturing ultra-fine particles using an electrospray device, comprising a guide duct; one or more capillary of which tip is positioned within said guide duct, and which is connected to an injecting means for supplying solution to be sprayed, liquid droplets being sprayed from the tip of said capillary; a carrier gas supplying means for supplying carrier gas into said guide duct to carry the liquid droplets along said guide duct; a voltage applying means connected to said capillary and said guide duct so as to generate voltage difference therebetween; a heating means for heating outer surface of said guide duct so as to evaporate the sprayed liquid droplets and generate chemical reactions thereof; and a collecting means disposed to be spaced apart from an outlet of said guide duct by a predetermined distance for collecting the ultra-fine particles formed through said chemical reactions.

According to another aspect of the present invention, there is also provided an apparatus for manufacturing ultra-fine particles using an electrospray device, comprising a first guide duct; a second guide duct positioned at an outer side of said first guide duct and having an axis coaxial with said first guide duct; a third guide duct positioned at an outer side of said second guide duct and having an axis coaxial with said first and second guide ducts; one or more capillary of which tip is positioned within said first guide duct, and which is connected to an injecting means for supplying solution to be sprayed, liquid droplets being sprayed from the tip of said capillary; a carrier gas supplying means for supplying carrier gas into said first guide duct to carry the liquid droplets along said first guide duct; a sheath gas supplying means for supplying sheath gas into said second guide duct; a fuel gas supplying means for supplying fuel gas into said third guide duct; a voltage applying means connected to said capillary and said first guide duct so as to generate a voltage difference therebetween; and a collecting means disposed to be spaced apart from outlets of said guide ducts by a predetermined distance for collecting the ultra-fine particles formed through chemical reactions.

According to a further aspect of the present invention, there is provided a method for manufacturing ultra-fine particles using an electrospray device, comprising the steps of injecting solution to be sprayed into one or more capillary of which tip is positioned within a guide duct; applying a high voltage to said capillary and applying a low voltage to said guide duct; applying energy to liquid droplets sprayed from the tip of said capillary so that chemical reactions thereof can occur; and collecting ultra-fine particles formed through said chemical reactions by using a collecting means positioned in front of said guide duct.

BEST MODE FOR CARRYING OUT THE INVENTION

Hereinafter, embodiments of an apparatus and method for manufacturing ultra-fine particles using an electrospray device according to the present invention will be explained in detail with reference to the accompanying drawings.

Figure 1:
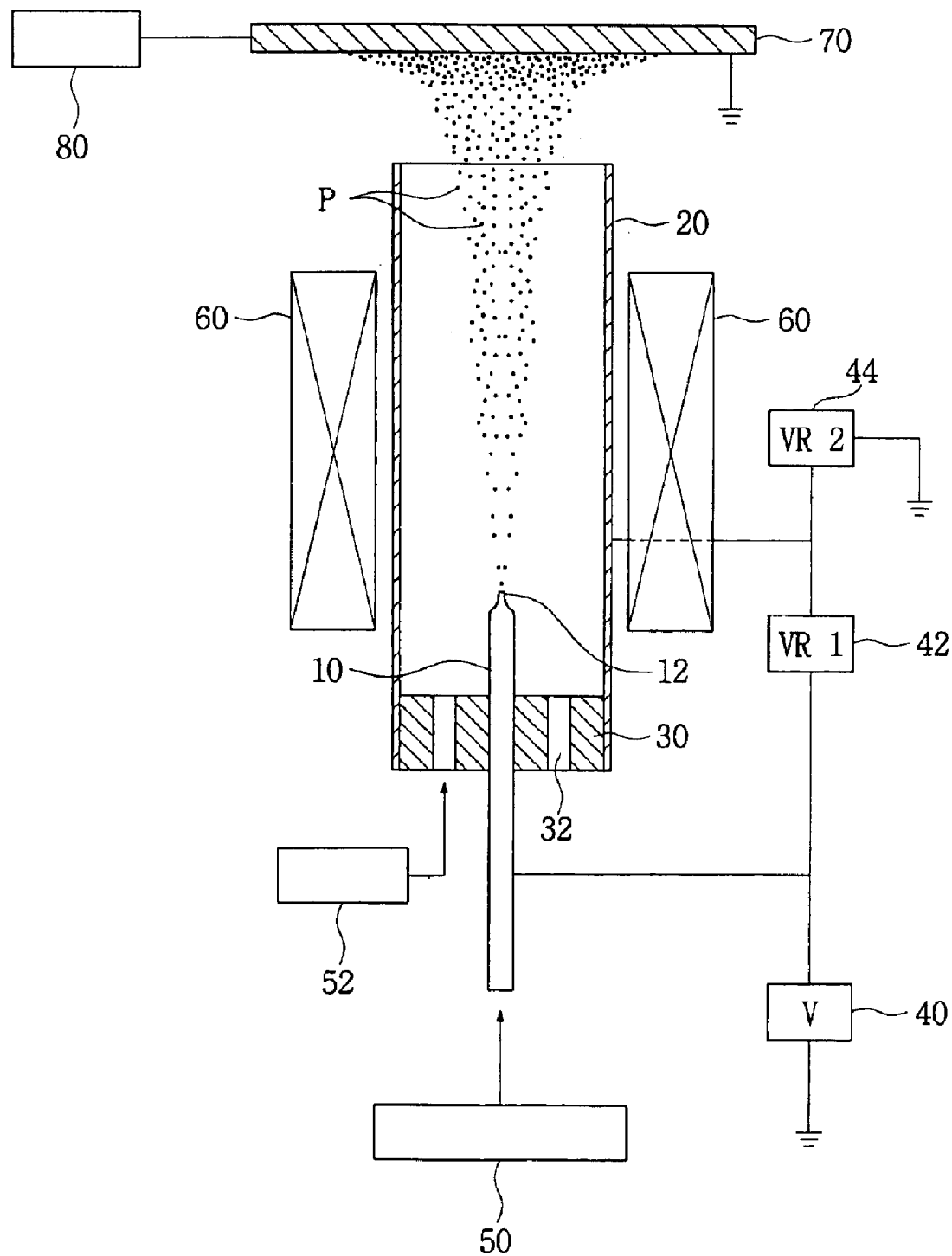
FIG. 1 is a sectional view showing a first embodiment of an apparatus for manufacturing ultra-fine particles according to the present invention.

First, the constitution of a first embodiment of an apparatus for manufacturing ultra-fine particles according to the present invention will be explained with reference to FIG. 1. Referring to FIG. 1, a portion of a capillary 10 is positioned within a hollow guide duct 20. The capillary 10 is provided at its tip with a nozzle 12 for spraying fine liquid droplets. In order to generate the sprayed liquid droplets, a well known injecting means 50 for injecting solution to be sprayed in which precursors such as metal organic materials and metal halogen compounds, or nonvolatile substances or nonvolatile materials exist is connected to the capillary 10. The injecting means 50 includes an injector for injecting a constant volume of liquid by means of a syringe pump or the like for adjustably supplying a flow of the precursor, or an injector for injecting the solution by means of compressed air or gravity. The capillary 10 may be replaced with a container having an orifice. The cylindrical guide duct 20 may be replaced with other guide ducts having rectangular or hexagonal cross-sectional shape. A supporting member 30 is fitted into the guide duct 20. The capillary 10 is installed to pass through the supporting member 30, and the supporting member 30 has a throughhole 32 adapted to communicate with the interior of the guide duct 20. In order to quickly move the sprayed liquid droplets P, carrier gas for carrying the sprayed liquid droplets is injected by a conventional carrier gas injecting means 52 through the throughhole 32. Inert gas such as nitrogen $N_2$ and argon Ar, or reactive gas such as oxygen $O_2$ can be used as the carrier gas.

A high voltage is applied to the capillary 10 from a power supply 40, while a low voltage having the same polarity as the voltage applied to the capillary 10 is applied to the guide duct 20. In order to generate a voltage difference between the capillary 10 and the guide duct 20, a first variable resistor 42 drops a high voltage from the power supply 40. In addition, a second variable resistor 44 is connected to the first variable resistor 42 so as to further drop the voltage dropped by the first variable resistor 42, and is connected to ground. If the first and second variable resistors 42, 44 have the equal voltage levels, a voltage applied between the capillary 10 and the guide duct 20 becomes the same as a voltage applied between the guide duct 20 and the ground. In the present embodiment, although the variable resistors 42, 44 are used for generating the voltage difference between the capillary 10 and the guide duct 20, they may be replaced with fixed resistors. In addition, instead of the single power supply 40 and the two variable resistors 42, 44, two power supplies may be used so that a high voltage can be applied to the capillary 10 and a low voltage can be applied to the guide duct 20.

A heater 60 for heating the guide duct 20 and applying energy to the sprayed liquid droplets P is installed around an outer surface of the guide duct 20. A conventional heat generator using resistance wires is used as the heater 60, and a device capable of applying the energy to the guide duct 20, such as an infrared lamp or an ultraviolet lamp, may be used.

A collecting plate 70 is disposed to be spaced apart from the guide duct 20 by a predetermined distance in front of the outlet of the guide duct 20. The collecting plate 70 is electrically grounded, and a cooler 80 for cooling the collecting plate 70 is connected to the collecting plate 70 so as to increase its collecting efficiency. The cooling of the collecting plate 70 is carried out by the conventional cooler 80 capable of injecting cold substances into the collecting plate 70 or maintaining the collecting plate 70 at a low temperature. FIG. 1 shows the collecting plate 70 as a collecting means. However, instead of the collecting plate 70, a hollow collecting tube that is coaxially aligned with the guide duct 20 may be employed.

Figure 2:
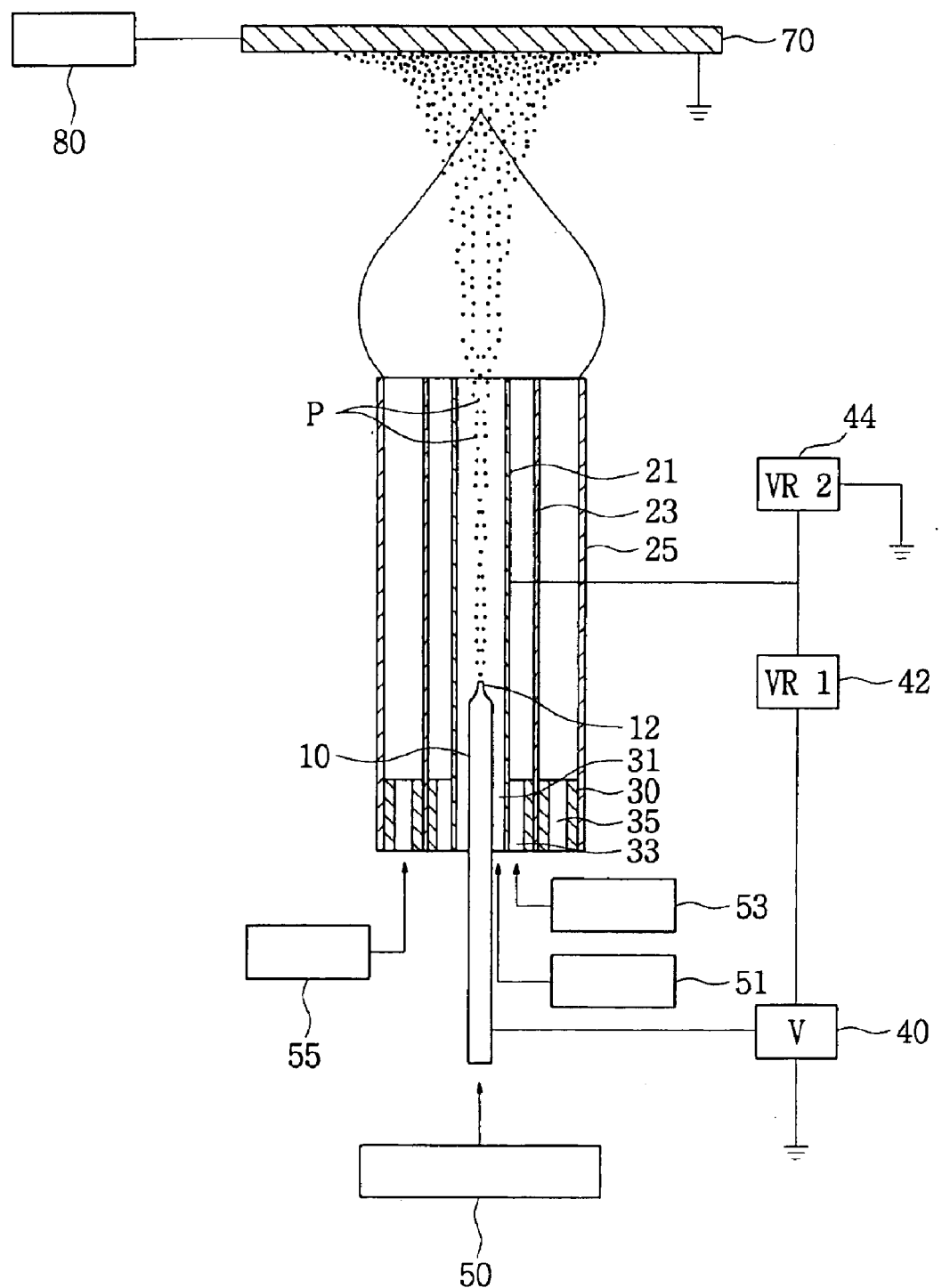
FIG. 2 is a sectional view showing a second embodiment of an apparatus for manufacturing ultra-fine particles according to the present invention.
Figure 3:
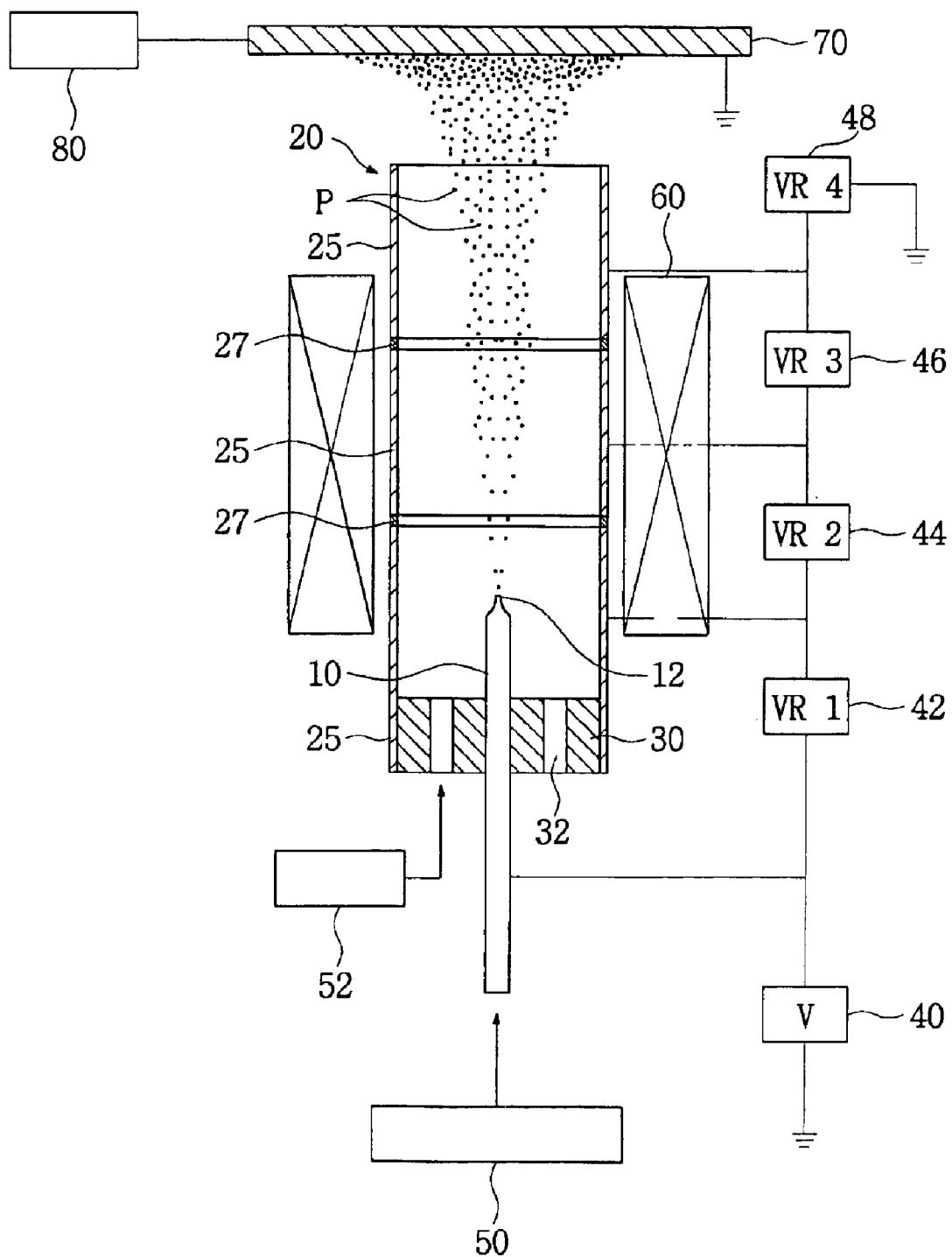
FIG. 3 is a sectional view showing a third embodiment of an apparatus for manufacturing ultra-fine particles according to the present invention.

Next, the constitution of a second embodiment of an apparatus for manufacturing ultra-fine particles according to the present invention will be explained. Referring to FIG. 2, similar to the first embodiment shown in FIG. 1, a portion of the capillary 10 is positioned within a first hollow guide duct 21, the capillary 10 is provided at its tip with the nozzle 12 from which the liquid droplets are sprayed, and the injecting means 50 for injecting solution to be sprayed is connected to the capillary 10. With the same power supply 40, first variable resistor 42 and second variable resistor 44 as the constitution shown in FIG. 1, a high voltage is applied to the capillary 10 while a low voltage is applied to the first guide duct 21.

Meanwhile, a second guide duct 23 disposed coaxially with the first guide duct 21 is provided at an outer side of the first guide duct 21, and a third guide duct 25 disposed coaxially with the first guide duct 21 is provided at an outer side of the second guide duct 23. A supporting member 30 is fitted into the first, second and third guide ducts 21, 23 and 25 and the capillary 10 is installed to pass through the supporting member 30. In the supporting member 30, a first throughhole 31, a second throughhole 33 and a third throughhole 35 are formed to communicate with the first guide duct 21, the second guide duct 23 and the third guide duct 25, respectively. Through the first throughhole 31, a conventional carrier gas injecting means 51 injects carrier gas for carrying the sprayed liquid droplets P so as to quickly move the sprayed liquid droplets P generated from the nozzle 12. Through the second throughhole 33, a conventional sheath gas injecting means 53 injects sheath gas. Through the third throughhole 35, a conventional fuel gas injecting means 55 injects fuel gas. The sheath gas prevents heat of flames from being transferred to the first guide duct 21 when the flames occur at the end of the third guide duct 25 by means of ignition of the injected fuel gas. At the same time, the sheath gas prevents the sprayed liquid droplets P discharged from the interior of the first guide duct 21 from chemically reacting at the end of the first guide duct 21.

In addition, similar to the first embodiment shown in FIG. 1, the electrically grounded collecting plate 70 is disposed in front of outlets of the first, second, third guide ducts 21, 23 and 25, and the cooler 80 for cooling the collecting plate 70 is connected to the collecting plate 70.

Next, referring to FIG. 3, a third embodiment of an apparatus for manufacturing ultra-fine particles according to the present invention will be explained. The third embodiment is constructed by continuously combining a plurality of mutually connected guide ducts 25, instead of a single long guide duct 20 shown in FIG. 1. Insulating materials 27 are interposed between the guide ducts 25 adjacent to each other so as to electrically insulate the adjacent guide ducts 25. Voltages are distributed and applied to the respective guide ducts 25 by means of the first, second, third and fourth variable resistors 42, 44, 46 and 48. Accordingly, an electric field gradient is generated within the guide ducts 20. At this time, since the gradient of the electric field within the entire guide ducts 20 of this embodiment becomes larger than that within the guide duct 20 of the first embodiment, the sprayed liquid droplets quickly move from the nozzle 12 to the outlet of the guide ducts 20.

Referring to FIG. 4, a fourth embodiment shown in FIG. 4 has the constitution of installing the capillary, which is different from those of the first to third embodiments shown in FIGS. 1 to 3. In the first to third embodiments, the supporting member 30 is fixed into the guide duct 20 as mentioned above. However, in the fourth embodiment, the supporting member is not fixed into the guide duct 20. That is, the inlet of the guide duct 20 is fully opened. In the fourth embodiment, the capillary 10 passes through the outer wall of the guide duct 20 and protrudes to the outside of the guide duct 20. The capillary 10 and the guide duct 20 are electrically insulated from each other by insulating materials 62.

Figure 4:
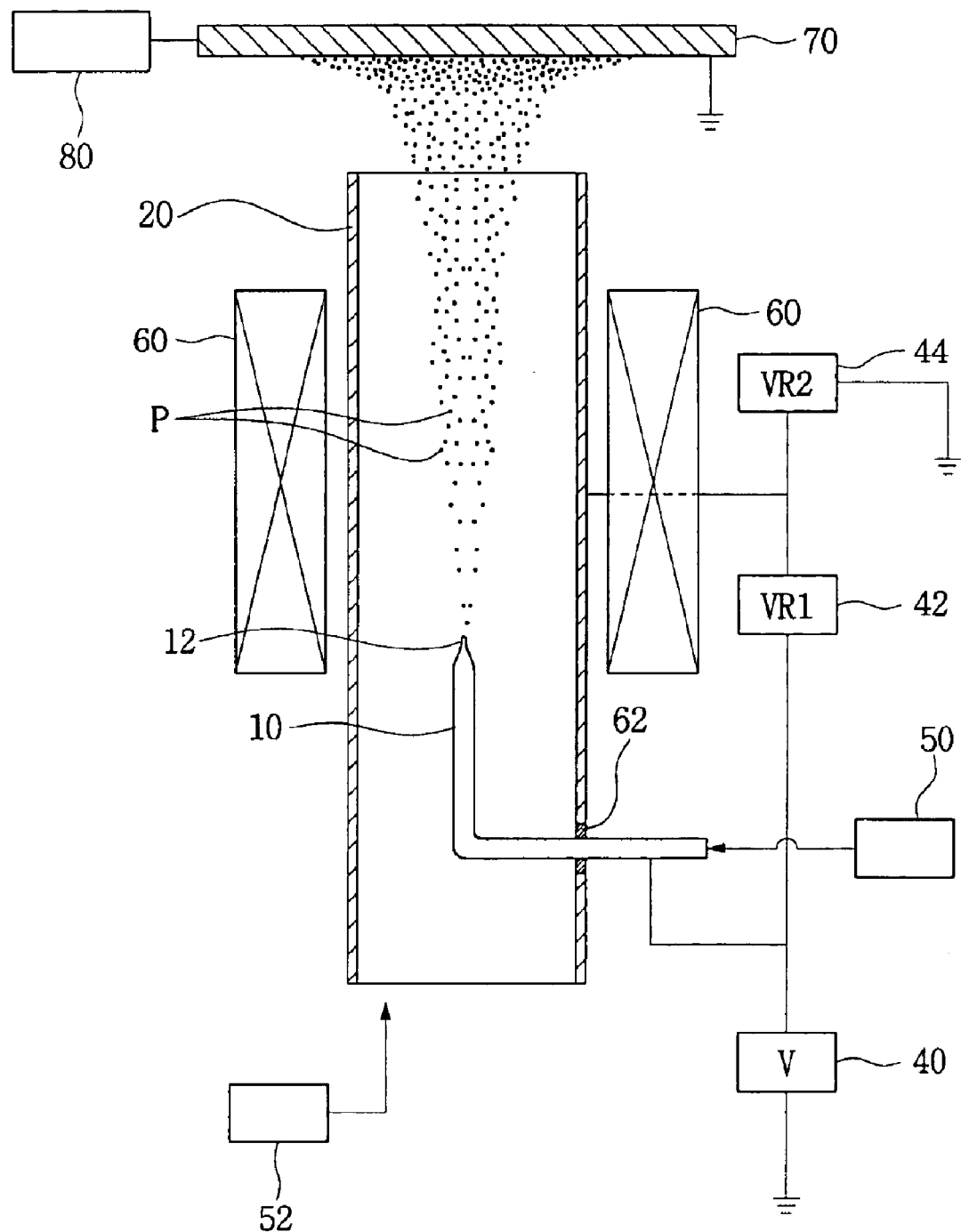
FIG. 4 is a sectional view showing a fourth embodiment of an apparatus for manufacturing ultra-fine particles according to the present invention.
Figure 5:
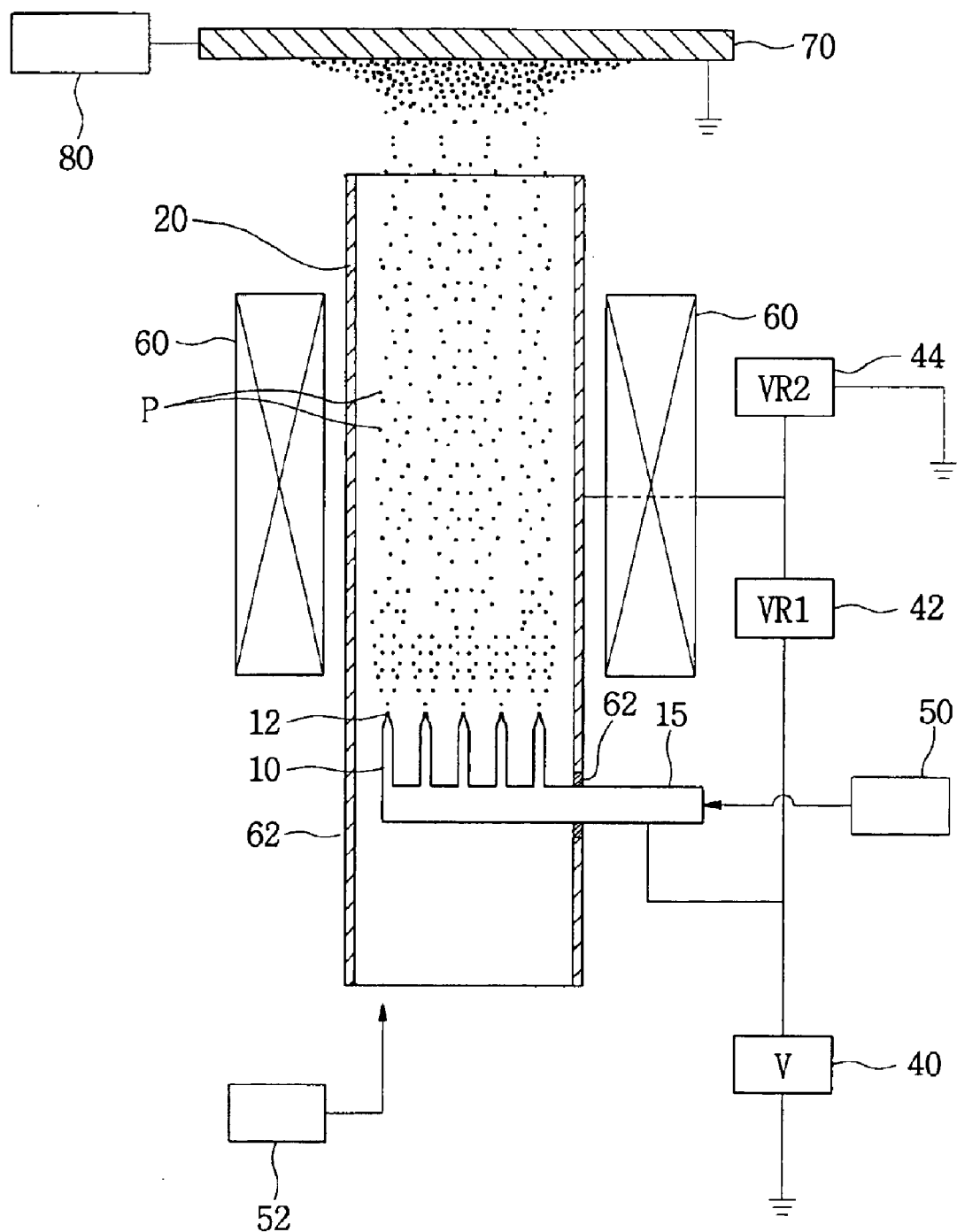
FIG. 5 is a sectional view showing a fifth embodiment of an apparatus for manufacturing ultra-fine particles according to the present invention.
Figure 6:
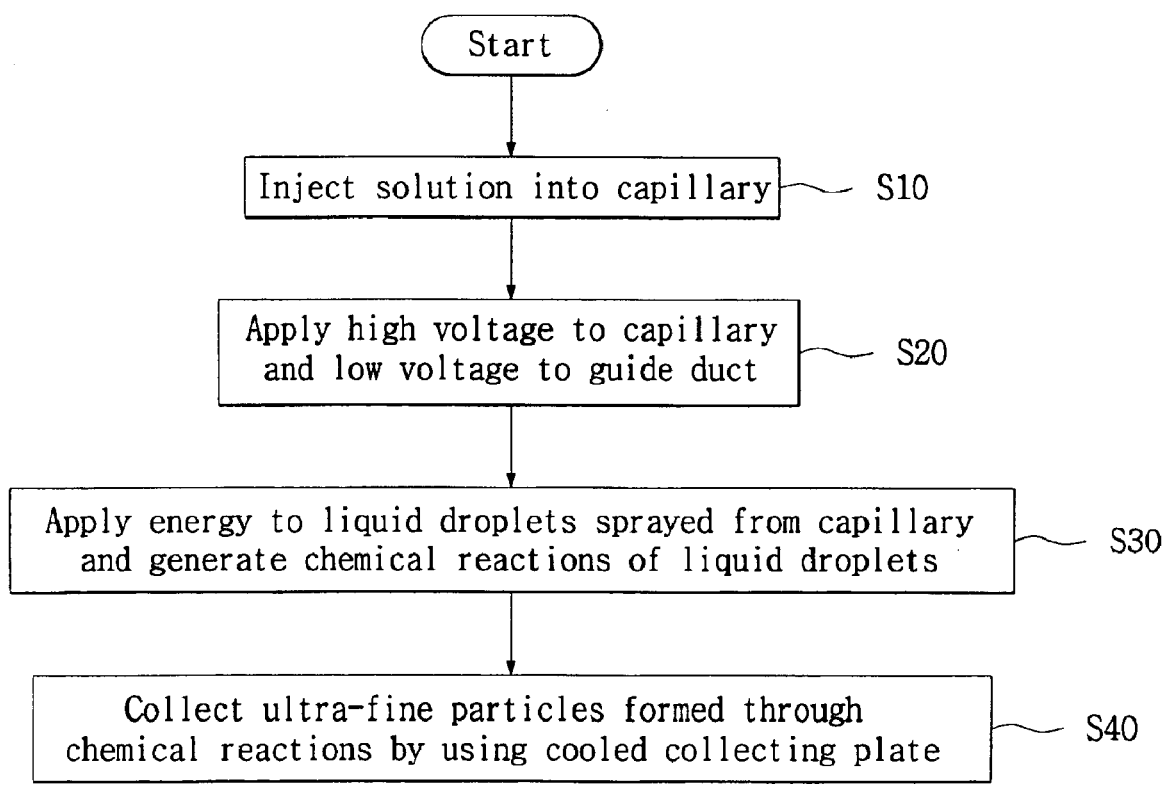
FIG. 6 is a flow chart showing a method for manufacturing ultra-fine particles according to the present invention.

Referring to FIG. 5, similar to the embodiment shown in FIG. 4, the supporting member is not also fitted into the guide duct 20 in an embodiment shown in FIG. 5. In order to generate a larger quantity of liquid droplets as compared with the embodiments of FIGS. 1 to 4, the embodiment shown in FIG. 5 has the constitution that a plurality of capillaries 10 are formed on a single pipe 15 such that the capillaries 10 extend therefrom. The pipe 15 passes through the outer wall of the guide duct 20 and protrudes to the outside thereof. The pipe 15 is also insulated from the guide duct 20 by the insulating materials 62.

Now, a method for manufacturing ultra-fine particles using an electrospray device according to the present invention will be explained with reference to FIG. 6 together with FIGS. 1 to 5.

According to the aforementioned constitution, solution to be sprayed is injected into the capillary 10 by the well known means 50 (step S10). Then, different voltages are applied to the capillary 10 and the guide duct 20 or the first guide duct 21, respectively (step S20). That is, a high voltage from a high voltage power supply 40 is applied to the capillary 10, while a low voltage is applied to either the guide duct 20 or the first guide duct 21. Accordingly, a very high voltage gradient is generated in the liquid sprayed from the nozzle 12. Further, the balance between electrostatic force for attracting the liquid by the electric field and surface tension of the liquid is broken on the surface of the liquid, and thus, the surface of the liquid is broken. Large quantities of liquid droplets P are generated from the liquid. The liquid droplets thus generated are extremely fine in the order of about several nanometers to several hundred nanometers. In addition, the liquid droplets are highly charged with electricity so that their quantity of electric charge reaches the Rayleigh charge limit. The sprayed liquid droplets thus generated are highly charged, and their polarities are the same.

As described above, in a case where high and low voltages having the same polarities are applied to the capillary 10 and the guide duct 20 or the first guide duct 21 in the second embodiment, respectively, the highly charged sprayed liquid droplets P generated from the nozzle 12 generally move toward the surface having the opposite polarity. However, since the voltage applied to either the guide duct 20 or the first guide duct 21 is low but has the same polarity as the highly charged liquid droplets P, the highly charged liquid droplets P continue to move along a central axis of the guide duct 20 or the first guide duct 21 toward a portion to which a lower voltage is applied, without adhering to the wall of the guide duct 20 or the first guide duct 21.

According to the constitutions of the first, and the third to fifth embodiments, since the guide duct 20 is heated by the heater 60, the interior of the guide duct 20 goes into a high temperature state (step S30). Accordingly, when the highly charged liquid droplets P move to the end of the guide duct 20 and reach a high temperature region, the sprayed liquid droplets P starts to evaporate. When the sprayed liquid droplets P are completely evaporated, electric charges existing in the liquid droplets P are also discharged from the liquid droplets P. Thus, the region where the liquid droplets P are evaporated is filled with a large quantity of the electric charges. At this time, chemical reactions of gases evaporated from the liquid droplets P occur due to the high temperature. As these chemical reactions occur, metallic or non-metallic ultra-fine particles are formed. By using ions distributed around the ultra-fine particles as nuclei, new ultra-fine particles are formed. Therefore, these hyperfine liquid droplets thus formed are naturally charged and quickly discharged to the outside of the guide duct 20 by the electric field gradient existing in the interior of the guide duct 20 and their flow stream. At this time, since these ultra-fine particles have the same polarity, they do not adhere to each other.

Meanwhile, in a case where nonvolatile liquid or liquid containing nonvolatile particles therein is used as solution to be sprayed, the sprayed liquid droplets P are not completely evaporated. That is, unevaporated substances such as the nonvolatile liquid or particles exist. However, when the unevaporated substances are formed into the metallic or nonmetallic ultra-fine particles through a pyrolysis process, the sprayed liquid droplets generated from the electrospray device have been already lavishly charged. Thus, the liquid droplets do not adhere to each other and are discharged to the outside by an electric field and their flow stream, even if they collide with each other during the pyrolysis process.

Therefore, both in a case where the solution to be sprayed has been completely evaporated and in a case where the solution to be sprayed has not been completely evaporated, the ultra-fine particles formed through the chemical reactions naturally have the same polarity, and thus, cohesion of the ultra-fine particles due to collisions therebetween are hardly generated.

Next, since the collecting plate 70 is positioned in front of the outlet of the guide duct 20, the metallic or non-metallic ultra-fine particles formed through the chemical reactions at the high temperature region of the guide duct 20 as described above move to the outside of the guide duct 20 and continuously adhere to the collecting plate 70 (step S40). At this time, since the ultra-fine particles have the same polarity, they do not adhere to each other, but adhere to the collecting plate 70. In addition, since the collecting plate 70 is cooled by the cooler 80, ultra-fine particles efficiently adhere to the collecting plate 70. As described above, the ultra-fine particles discharged from the guide duct 20 very efficiently adhere to the collecting plate 70 through two physical phenomena, i.e., electric field and thermophoresis.

According to the constitution of the second embodiment of the present invention, carrier gas is supplied by the carrier gas injecting means 51 so as to quickly move highly charged atomized liquid droplets, sheath gas is supplied between the first guide duct 21 and the second guide duct 23 by the sheath gas injecting means 53, and fuel gas is supplied between the second guide duct 23 and the third guide duct 25 by the fuel gas injecting means 55. When the fuel gas, which is discharged through between the second duct 23 and the third duct 25 to the outside, is ignited, thermal energy is generated through combustion of the fuel gas. As described in the first embodiment, the liquid droplets P discharged from the first guide duct 21 are evaporated by this thermal energy. As the liquid droplets are evaporated, electric charges existing in the liquid droplets P are discharged from the liquid droplets P and chemical reactions of the evaporated liquid droplets occur by the thermal energy generated from the combustion of the fuel gas. Accordingly, new metallic or non-metallic ultra-fine particles are formed with ions used as nuclei. Naturally, the newly formed ultra-fine particles are highly charged. Thus, the ultra-fine particles are discharged to the outside under the action of the electric field, adhere to the collecting plate 70, and are collected on the plate 70.

Meanwhile, since the sheath gas injecting means 53 supplies sheath gas between the first guide duct 21 and the second guide duct 23 as described above, the sheath gas is discharged to the ends of the first guide duct 21 and the second guide duct 23. Since the discharged sheath gas prevents the thermal energy generated through the ignition of the fuel gas from being transferred to the end of the first guide duct 21, chemical reactions do not occur at the end of the first guide duct 21. Therefore, since the chemically reacted ultra-fine particles do not adhere to an inner wall of the first guide duct 21, the outlet of the first guide duct 21 is not clogged. Accordingly, the atomized liquid droplets continue to be smoothly discharged.

Although the various embodiments of the present invention have been described in the above, the spirit and scope of the present invention is not limited only to the above embodiments. The specific shapes and structures shown in the above embodiments are described as only exemplified examples. In addition to the above embodiments, various modifications to the present invention may be made without departing from the spirit and scope of the claims. For example, although it has been described that all the above embodiments include an axially symmetrical guide duct and capillary or nozzle, the objects of the present invention can be achieved by providing a guide duct having another sectional shape other than the axially symmetrical ones. In addition, a plurality of nozzles can be used.

INDUSTRIAL APPLICABILITY

As described above, according to an apparatus and method for manufacturing ultra-fine particles using an electro-hydrodynamic atomizer of the present invention, collecting efficiency of the hyperfine liquid droplets can be very high and sizes of the ultra-fine particles to be collected can be controlled.

What is claimed is:

1. An apparatus for manufacturing ultra-fine particles using an electrospray device, comprising:
    a dust guide duct;
    one or more capillary of which tip is positioned within said guide duct, and which is connected to an injecting means for supplying solution to be sprayed, liquid droplets being sprayed from the tip of said capillary;
    a carrier gas supplying means positioned at the rear of the tip of said capillary for supplying carrier gas into said guide duct to carry the liquid droplets along said guide duct;
    a voltage applying means connected to said capillary and said guide duct so as to generate voltage difference therebetween, and a high voltage being applied to said capillary and a low voltage being applied to said guide duct and having the same polarity as the high voltage applied to said capillary;
    a heating means for heating outer surface of said guide duct so as to evaporate the sprayed liquid droplets and generate chemical reactions thereof;
    a collecting means disposed to be spaced apart from an outlet of said guide duct by a predetermined distance for collecting the ultra-fine particles formed through said chemical reactions.

2. The apparatus as claimed in claim 1, further comprising a supporting member which is fitted into said guide duct, with said capillary held by the supporting member while passing through the supporting member, said supporting member being provided with a throughhole for allowing interior of said guide duct to communicate with outside of said guide duct.

3. The apparatus as claimed in claim 2, further comprising a cooling means connected to said collecting means for cooling said collecting means.

4. The apparatus as claimed in claim 1, wherein said guide duct is constructed with a plurality of mutually connected and electrically insulated tubes so that a different level of voltage is applied to the respective tube.

5. The apparatus as claimed in claim 1, wherein said capillary comprises a plurality of capillaries, and the plurality of capillaries are formed on a pipe so that the capillaries can extends therefrom.

6. The apparatus as claimed in claim 5, wherein said pipe is installed to pass through an outer wall of said guide duct, and said pipe and said guide duct are electrically insulated from each other.

7. The apparatus as claimed in claim 1, wherein said voltage applying means comprises a single power supply and a plurality of variable resistors.

8. A method for manufacturing ultra-fine particles using an electrospray device, comprising the steps of:
    injecting solution to be sprayed into one or more spray capillary of which tip is positioned within guide duct;
    supplying carrier gas into said guide duct to carry liquid droplets being sprayed from the tip of said capillary;
    applying a high voltage to said capillary and applying a low voltage having the same polarity as the high voltage applied to said capillary to said guide duct;
    applying energy to the liquid droplets sprayed from the tip of said capillary so that chemical reactions thereof can occur; and
    collecting ultra-fine particles formed through said chemical reactions by using a collecting means positioned in front of said guide duct.

9. The method as claimed in claim 8, further comprising a step of cooling the collecting means.

10. The method as claimed in claim 8, wherein outer surface of said guide duct is heated so as to apply the energy to the sprayed liquid droplets.

11. The method as claimed in claim 8, wherein fuel gas is supplied into said guide duct and is ignited so as to apply the energy to the sprayed liquid droplets, and sheath gas is supplied into said guide duct so that flames generated from the ignition of the fuel gas can be blocked and said ultra-fine particles formed through said chemical reactions are prevented from adhering to an inner wall of said guide duct.

* * * * *